(12) United States Patent
Kasazumi et al.

(10) Patent No.: US 10,670,780 B2
(45) Date of Patent: Jun. 2, 2020

(54) FRESNEL LENS, FRESNEL LENS UNIT, AND HEAD-UP DISPLAY

(71) Applicant: Panasonic Intellectual Property Management Co., Ltd., Osaka (JP)

(72) Inventors: Ken'ichi Kasazumi, Osaka (JP); Toshiya Mori, Osaka (JP); Kosuke Kubota, Osaka (JP); Masahito Ogata, Osaka (JP); Hiroaki Okayama, Nara (JP); Satoshi Kuzuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 16/068,956

(22) PCT Filed: Jan. 10, 2017

(86) PCT No.: PCT/JP2017/000380
§ 371 (c)(1),
(2) Date: Jul. 10, 2018

(87) PCT Pub. No.: WO2017/126353
PCT Pub. Date: Jul. 27, 2017

(65) Prior Publication Data
US 2019/0011611 A1 Jan. 10, 2019

(30) Foreign Application Priority Data

Jan. 20, 2016 (JP) .................................. 2016-009299

(51) Int. Cl.
*G02B 27/14* (2006.01)
*G02B 3/08* (2006.01)
(Continued)

(52) U.S. Cl.
CPC ................ *G02B 3/08* (2013.01); *B60K 35/00* (2013.01); *G02B 27/01* (2013.01);
(Continued)

(58) Field of Classification Search
CPC ...................................................... G02B 3/08
(Continued)

(56) References Cited

U.S. PATENT DOCUMENTS

| 5,676,804 A | 10/1997 | Fujii et al. |
| 2015/0138654 A1* | 5/2015 | Boccoleri ................ G02B 3/08 359/738 |
| 2015/0362720 A1 | 12/2015 | Saito |

FOREIGN PATENT DOCUMENTS

| JP | 52-143847 | 11/1977 |
| JP | 6-123801 | 5/1994 |

(Continued)

OTHER PUBLICATIONS

International Search Report of PCT application No. PCT/JP2017/000380 dated Apr. 11, 2017.

*Primary Examiner* — James C. Jones
(74) *Attorney, Agent, or Firm* — Greenblum & Bernstein, P.L.C.

(57) ABSTRACT

The present invention provides a Fresnel lens that can reduce generation of concentric stray light. The Fresnel lens includes a sawtooth corrugated face that is formed by alternately disposing a first face inclined relative to optical axis A and a second face substantially parallel to optical axis A, and a light shielding mask is formed at a position corresponding to the second face.

4 Claims, 11 Drawing Sheets

(51) Int. Cl.
*B60K 35/00* (2006.01)
*G02B 27/01* (2006.01)
*G01C 21/36* (2006.01)

(52) U.S. Cl.
CPC .. *G02B 27/0101* (2013.01); *B60K 2370/1529* (2019.05); *B60K 2370/334* (2019.05); *G01C 21/365* (2013.01); *G02B 2027/0118* (2013.01)

(58) Field of Classification Search
USPC .......................................................... 359/630
See application file for complete search history.

(56) References Cited

FOREIGN PATENT DOCUMENTS

| | | |
|---|---|---|
| JP | 8-136707 | 5/1996 |
| JP | 9-043405 | 2/1997 |
| JP | 2006-323114 | 11/2006 |
| JP | 2014-043205 | 3/2014 |
| JP | 2015-184625 | 10/2015 |
| JP | 2016-001209 A | 1/2016 |
| JP | 2016-176981 | 10/2016 |

* cited by examiner

FRESNEL LENS, FRESNEL LENS UNIT, AND HEAD-UP DISPLAY

This application is a U.S. national stage application of the PCT International Application No. PCT/JP2017/000380 filed on Jan. 10, 2017 which claims the benefit of foreign priority of Japanese patent application No. 2016-009299 filed on Jan. 20, 2016, the contents all of which are incorporated herein by reference.

TECHNICAL FIELD

The present disclosure relates to a Fresnel lens, a Fresnel lens unit, and a head-up display.

BACKGROUND ART

For example, a vehicular head-up display (HUD) has been known as a display device for displaying an image (for example, see PTL 1). What is called augmented reality (AR) is used in the head-up display, and a virtual image of an image, which is formed on a movable screen, is displayed in a space in front of a windshield of a vehicle. With this configuration, a driver can view information about driving (for example, car navigation information) superimposed on a scene in front of the windshield.

CITATION LIST

Patent Literature

PTL 1: Unexamined Japanese Patent Publication No. 2014-43205

SUMMARY OF THE INVENTION

Technical Problem

The present disclosure provides a Fresnel lens that can reduce generation of concentric stray light.

Solution to Problem

According to one aspect of the present disclosure, a Fresnel lens includes a sawtooth corrugated face that is formed by alternately disposing a first face inclined relative to an optical axis and a second face substantially parallel to the optical axis. Alight shielding mask is formed at a position corresponding to the second face.

According to another aspect of the present invention, a head-up display includes a light source that emits a light beam, a scanner that scans the light beam from the light source, a screen in which an image is formed by transmission of the light beam from the scanner through the screen, and an optical system that displays a virtual image of the image formed on the screen in a space. The optical system includes a Fresnel lens or a Fresnel lens unit.

Advantageous Effect of Invention

The generation of the concentric stray light can be reduced in the Fresnel lens of the present invention.

DESCRIPTION OF EMBODIMENTS (Knowledge Underlying the Present Invention)

The inventors have found that the following problem arises in the technology described in the section of "BACKGROUND ART".

In the head-up display of PTL 1, a Fresnel lens is used in an optical system (for example, an eyepiece optical system) of a video system. For this reason, in the head-up display of PTL 1, concentric stray light is generated due to scattered light and reflected light, which are generated by a step shape of the Fresnel lens. For this reason, in the head-up display of PTL 1, the concentric stray light is superposed on the image to degrade image quality.

In order to solve the problems, according to one aspect of the present disclosure, a Fresnel lens includes a sawtooth corrugated face that is formed by alternately disposing a first face inclined relative to an optical axis and a second face substantially parallel to the optical axis. A light shielding mask is formed at a position corresponding to the second face.

Accordingly, among the incident light beams, the incident light beam reflected by second face substantially parallel to the optical axis strikes on the light shielding mask, so that the incident light beam can be prevented from being output from the Fresnel lens toward the outside. Among the incident light beams, the incident light beam that is not reflected by the second face substantially parallel to the optical axis does not strike on the light shielding mask, so that the incident light beam can be output from the Fresnel lens toward the outside. Therefore, the generation of the stray light due to the reflection of the light beam by the second face can effectively be reduced.

The light shielding mask may be formed in a part of a region adjacent to the second face in the first face.

A face on an opposite side to the corrugated face of the Fresnel lens is a flat surface, and the light shielding mask may be formed at a position opposite the second face, in the face on the opposite side.

An edge of a mask pattern of the light shielding mask may have a meandering shape.

According to another aspect of the present disclosure, a Fresnel lens unit is a Fresnel lens including a sawtooth corrugated face that is formed by alternately disposing a first face inclined relative to an optical axis and a second face substantially parallel to the optical axis, the Fresnel lens unit including a transparent plate-shaped member disposed opposite the Fresnel lens, a light shielding mask being formed at a position opposite the second face, in the plate-shaped member.

An edge of a mask pattern of the light shielding mask may have a meandering shape.

According to still another aspect of the present disclosure, a head-up display includes a light source that emits a light beam, a scanner that scans the light beam from the light source, a screen in which an image is formed by transmission of the light beam from the scanner through the screen, and an optical system that displays a virtual image of the image formed on the screen in a space. The optical system includes the Fresnel lens or the Fresnel lens unit.

Hereinafter, exemplary embodiments will specifically be described with reference to the drawings.

The following exemplary embodiments provide comprehensive or specific examples of the present invention. Numerical values, shapes, materials, constituent elements, arrangement positions and connection modes of the constituent elements, steps, and order of the steps, for example, illustrated in the following exemplary embodiments are merely examples, and therefore are not intended to limit the present invention. Among the constituent elements in the following exemplary embodiments, constituent elements not recited in the independent claim indicating the broadest concept are described as optional constituent elements.

First Exemplary Embodiment

[1-1. Schematic Configuration of Head-Up Display]

Figure 1:
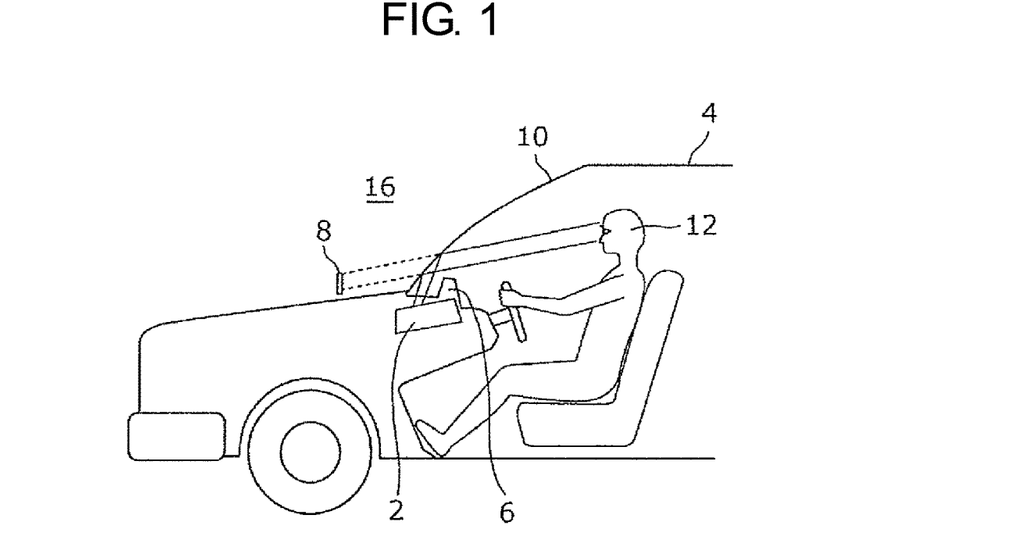
FIG. 1 is a view illustrating a use example of a head-up display according to a first exemplary embodiment.
Figure 2:
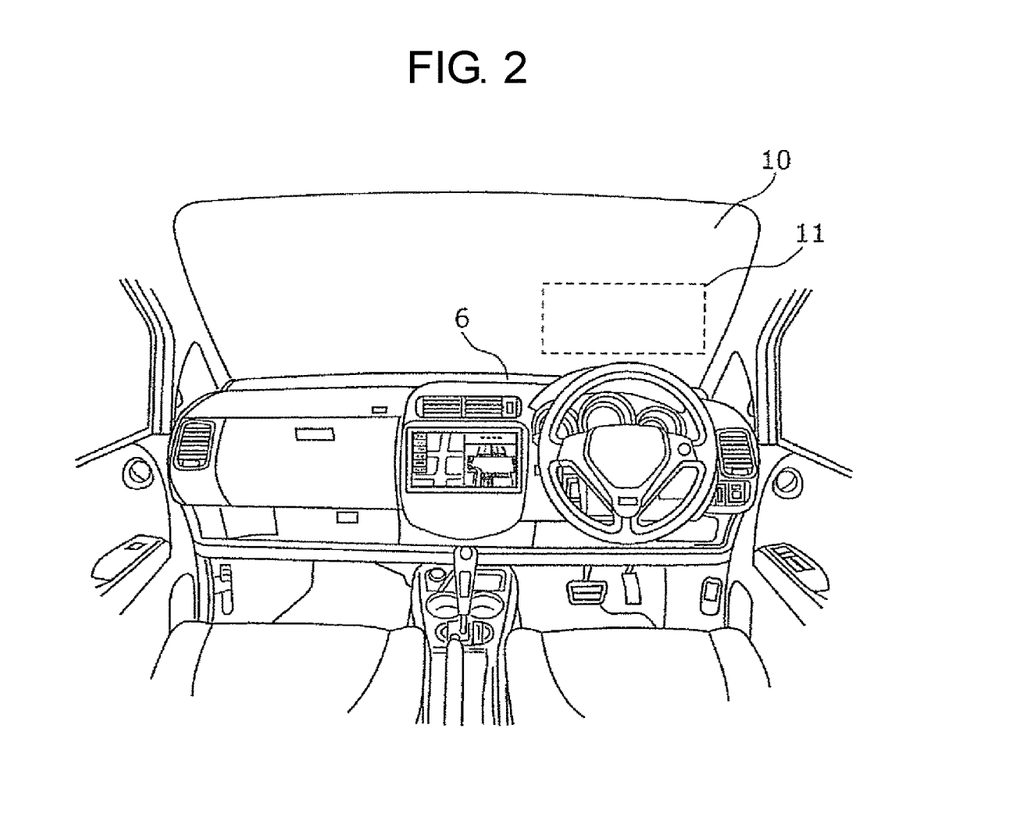
FIG. 2 is a view illustrating a region of an image displayed by the head-up display of the first exemplary embodiment.
Figure 3:
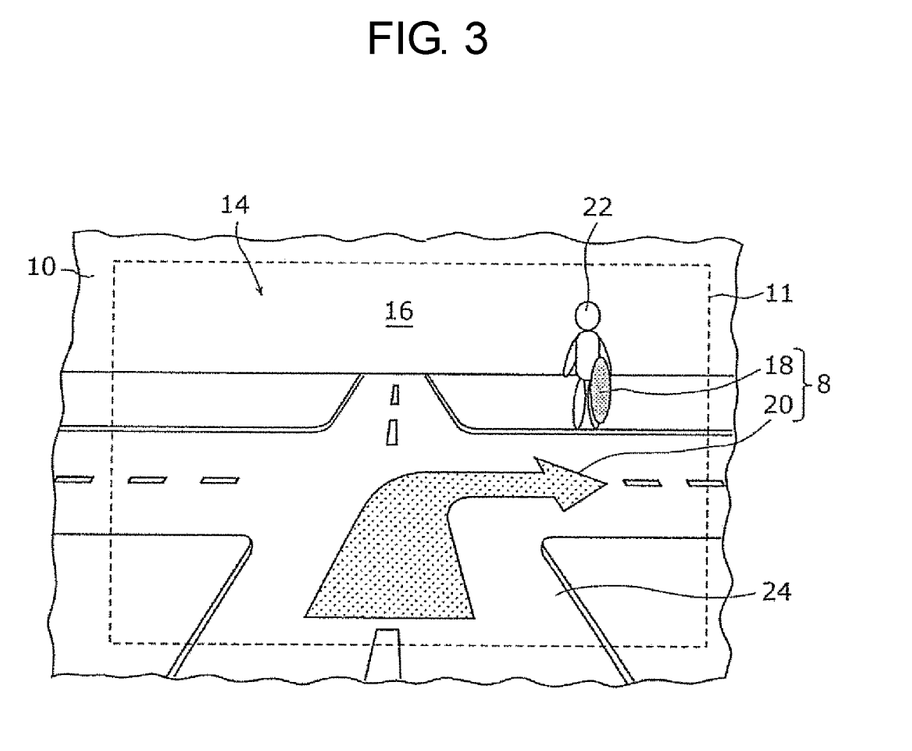
FIG. 3 is a view illustrating an example of the image displayed by the head-up display of the first exemplary embodiment.

A schematic configuration of head-up display 2 according to a first exemplary embodiment will be described with reference to FIGS. 1 to 3. FIG. 1 is a view illustrating a use example of head-up display 2 of the first exemplary embodiment. FIG. 2 is a view illustrating region 11 of image 8 displayed by head-up display 2 of the first exemplary embodiment. FIG. 3 is a view illustrating an example of image 8 displayed by head-up display 2 of the first exemplary embodiment.

As illustrated in FIG. 1, for example, head-up display 2 of the first exemplary embodiment is a vehicular head-up display, and is disposed in dashboard 6 of automobile 4 (an example of a vehicle).

As illustrated in FIGS. 1 and 2, head-up display 2 projects a laser beam (an example of a light beam) for displaying image 8 that is a virtual image toward, for example, region 11 that is located in a lower portion of windshield 10 and is close to a driver seat in vehicle 4, which allows the laser beam to be reflected toward driver 12 by windshield 10. Consequently, as illustrated in FIG. 3, driver 12 can view image 8 that is the virtual image superimposed on scene 14 in front of windshield 10. That is, head-up display 2 displays (projects) image 8 that is the virtual image in space 16 in front of windshield 10.

In the example of FIG. 3, image 8 displayed by head-up display 2 includes vertical image 18 and depth image 20. Vertical image 18 is a virtual image displayed in a vertical direction (an up-and-down direction in FIG. 1) in space 16 in front of windshield 10. For example, vertical image 18 is a mark having a vertically long, substantially elliptical shape. Vertical image 18 is displayed so as to be superimposed on pedestrian 22 existing in front of automobile 4. This enables driver 12 to easily notice the existence of pedestrian 22.

On the other hand, depth image 20 is a virtual image displayed in a depth direction (a right-and-left direction in FIG. 1) that is a direction intersecting the vertical direction in space 16 in front of windshield 10. For example, depth image 20 is an arrow for guiding a traveling route to a destination (in the example of FIG. 3, an arrow for instructing to turn right at an intersection), and is displayed while superimposed on road 24 existing in front of vehicle 4. This enables driver 12 to easily find the traveling route to the destination.

[1-2. Specific Configuration of Head-Up Display]

Figure 4:
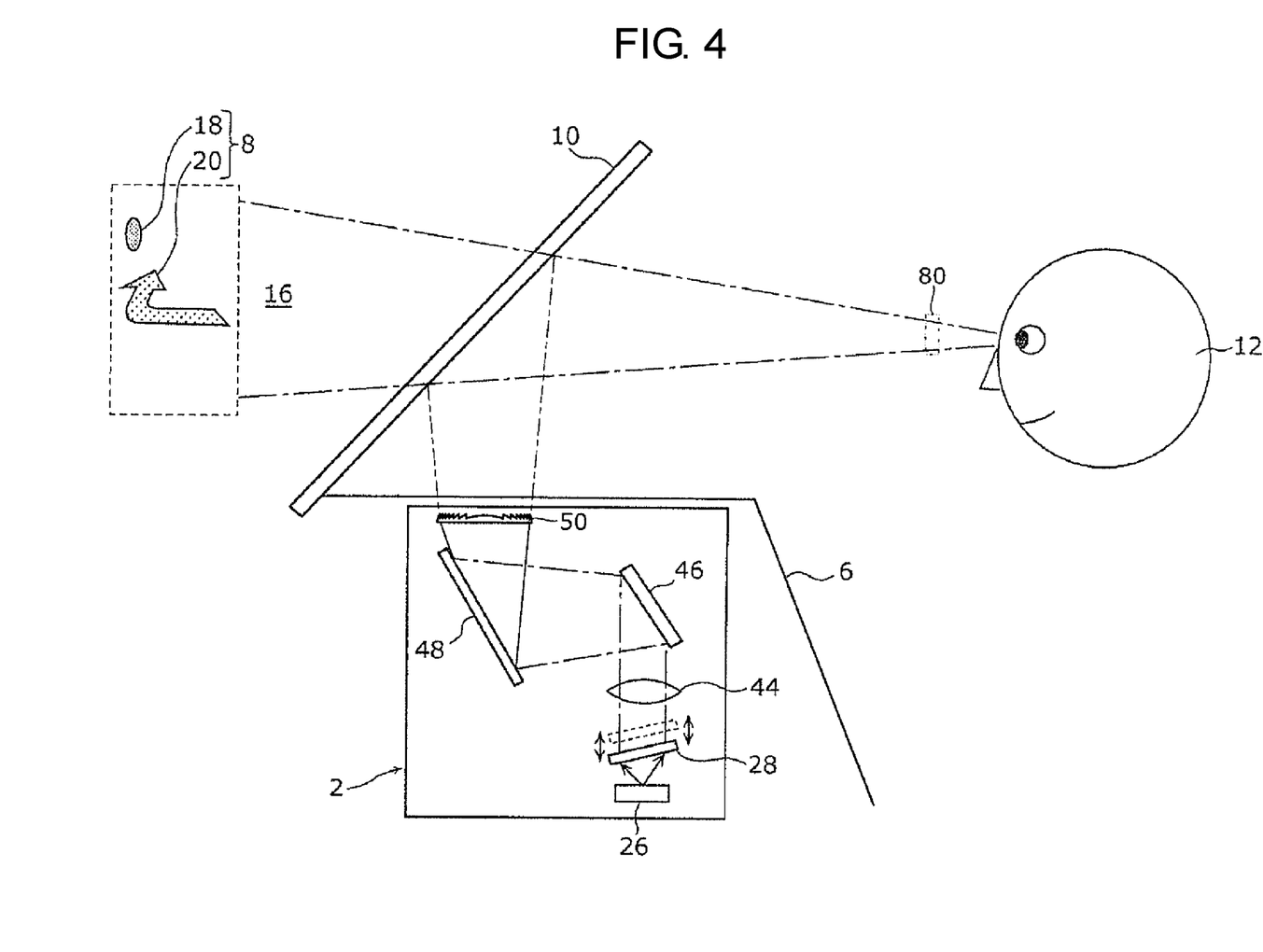
FIG. 4 is a view illustrating a configuration of the head-up display of the first exemplary embodiment.
Figure 5:
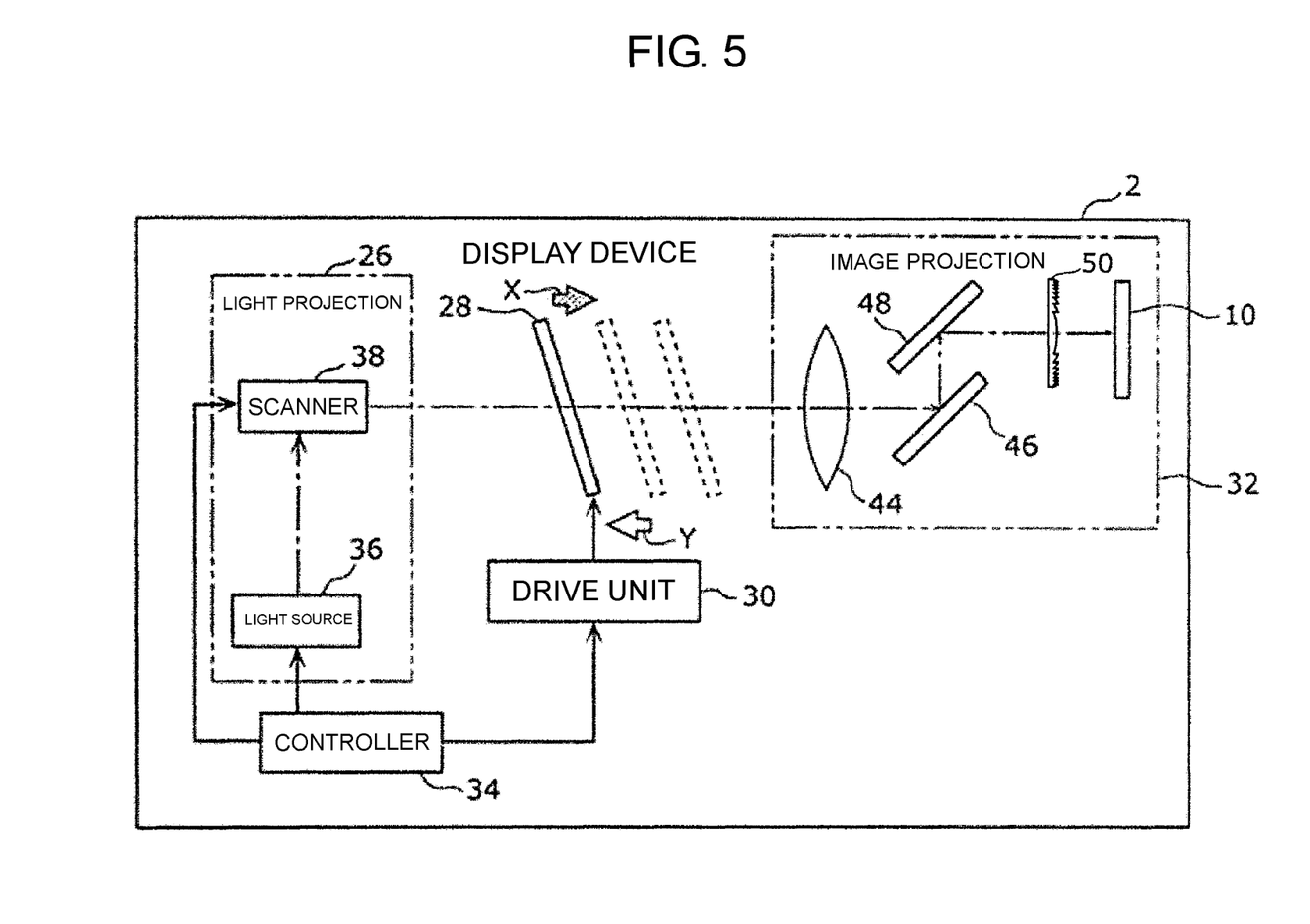
FIG. 5 is a block diagram illustrating a functional configuration of the head-up display of the first exemplary embodiment.

A specific configuration of head-up display 2 of the first exemplary embodiment will be described below with reference to FIGS. 4 and 5. FIG. 4 is a view illustrating a configuration of head-up display 2 of the first exemplary embodiment. FIG. 5 is a block diagram illustrating a functional configuration of head-up display 2 of the first exemplary embodiment.

As illustrated in FIGS. 4 and 5, head-up display 2 includes light projection unit 26, movable screen 28, drive unit 30, image projection unit 32 (an example of the optical system), and controller 34.

Light projection unit 26 includes light source 36 and scanner 38. Light source 36 includes a red laser diode that emits a laser beam having a red component (R), a green laser diode that emits a laser beam having a green component (G), and a blue laser diode that emits a laser beam having a blue component (B). The laser beam having the red component, the laser beam having the green component, and the laser beam having the blue component, which are emitted from light source 36, are incident on scanner 38 after being synthesized by, for example, a dichroic mirror (not illustrated).

For example, scanner 38 is constructed with a micro electro mechanical systems (MEMS) mirror. Scanner 38 reflects the incident laser beam toward a direction according to a deflection angle of scanner 38, thereby two-dimensionally raster-scanning the laser beam from light source 36 toward movable screen 28. For example, scanner 38 raster-scans the laser beam in a direction from one edge to the other edge of movable screen 28.

Movable screen 28 is a rectangular screen having translucency (for example, semi-transparency). As illustrated in FIG. 5, movable screen 28 is disposed on an optical path of the laser beam from scanner 38 while being reciprocable in a direction separating from scanner 38 (a direction (X-direction) indicated by arrow X in FIG. 5) and a direction approaching to scanner 38 (a direction (Y-direction) indicated by arrow Y in FIG. 5). Movable screen 28 reciprocates in a posture inclined relative to moving directions (the X-direction and the Y-direction) of movable screen 28.

When the laser beam from scanner 38 is raster-scanned toward movable screen 28 while movable screen 28 moves in the X-direction, an image is formed on movable screen 28. On the other hand, when the laser beam from scanner 38 is raster-scanned toward movable screen 28 while movable screen 28 moves in the Y-direction, another image is formed on movable screen 28. A fixed screen may be used instead of movable screen 28.

For example, drive unit 30 is constructed with an actuator. Based on a drive signal from controller 34, drive unit 30 reciprocally moves (vibrates) movable screen 28 in the X-direction and the Y-direction at a constant frequency (for example, 60 Hz) and with constant amplitude (for example, 1 mm). Based on the drive signal from controller 34, drive unit 30 reciprocally moves movable screen 28 such that a period of time during which movable screen 28 moves in the X-direction (or the Y-direction) is less than or equal to, for example, 25 msec.

Image projection unit 32 includes magnifying lens 44, first reflecting plate 46, second reflecting plate 48, Fresnel lens 50, and windshield 10.

Magnifying lens 44 is disposed on the optical path of the laser beam transmitted through movable screen 28. Magnifying lens 44 magnifies the image formed on movable screen 28.

First reflecting plate 46 and second reflecting plate 48 are disposed on the optical path of the laser beam from magnifying lens 44, and reflect the laser beam from magnifying lens 44 toward windshield 10. Consequently, first reflecting plate 46 and second reflecting plate 48 project the image magnified by magnifying lens 44 toward windshield 10 through Fresnel lens 50.

Fresnel lens 50 narrows a spread angle of the image that is magnified and spread by magnifying lens 44, whereby the image is projected while adjusted to a size having a range corresponding to eye-box 80 on windshield 10. As used herein, eye-box 80 means a predetermined range where eyes of driver 12 (observer) are assumed to exist.

Windshield 10 is disposed on the optical path of the laser beam from Fresnel lens 50, and reflects the laser beam from Fresnel lens 50 toward eye-box 80. Consequently, in the case that a predetermined image is formed on movable screen 28, vertical image 18 that is the virtual image of the predetermined image is displayed in space 16 in front of windshield 10.

Controller 34 has a function of outputting the drive signal to drive unit 30, a function of controlling a drive current supplied to light source 36, and a function of controlling the deflection angle of scanner 38. For example, controller 34 is constructed with a central processing unit (CPU) or a processor. Controller 34 reads and executes a computer program stored in a memory (not illustrated), thereby performing the above functions.

[1-3. Configuration of Fresnel Lens]

Figure 6:
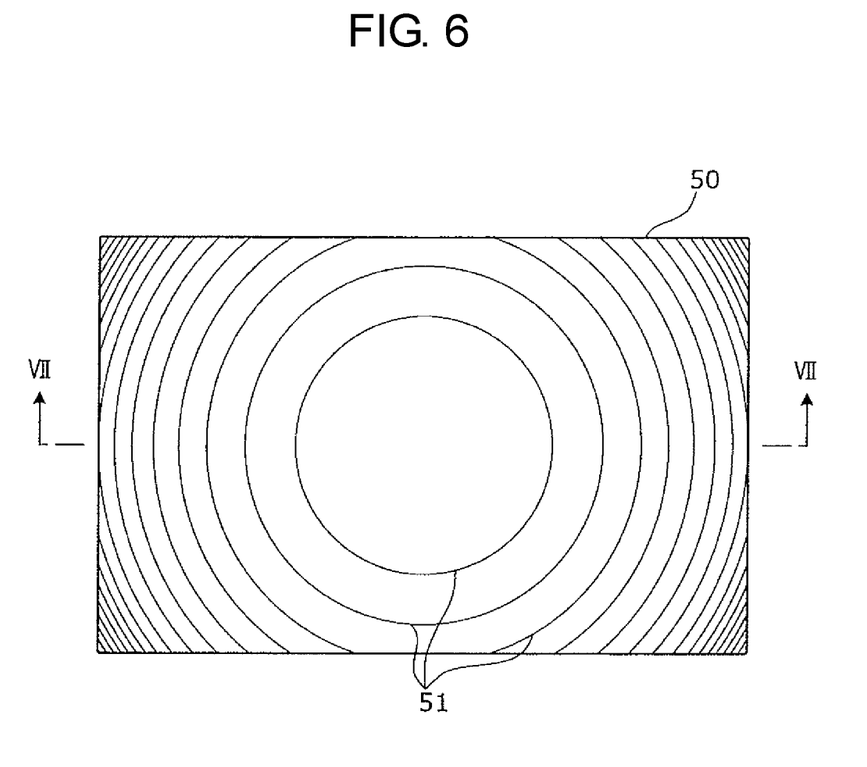
FIG. 6 is a plan view illustrating a Fresnel lens of the first exemplary embodiment when the Fresnel lens is viewed from an optical axis direction.
Figure 7:
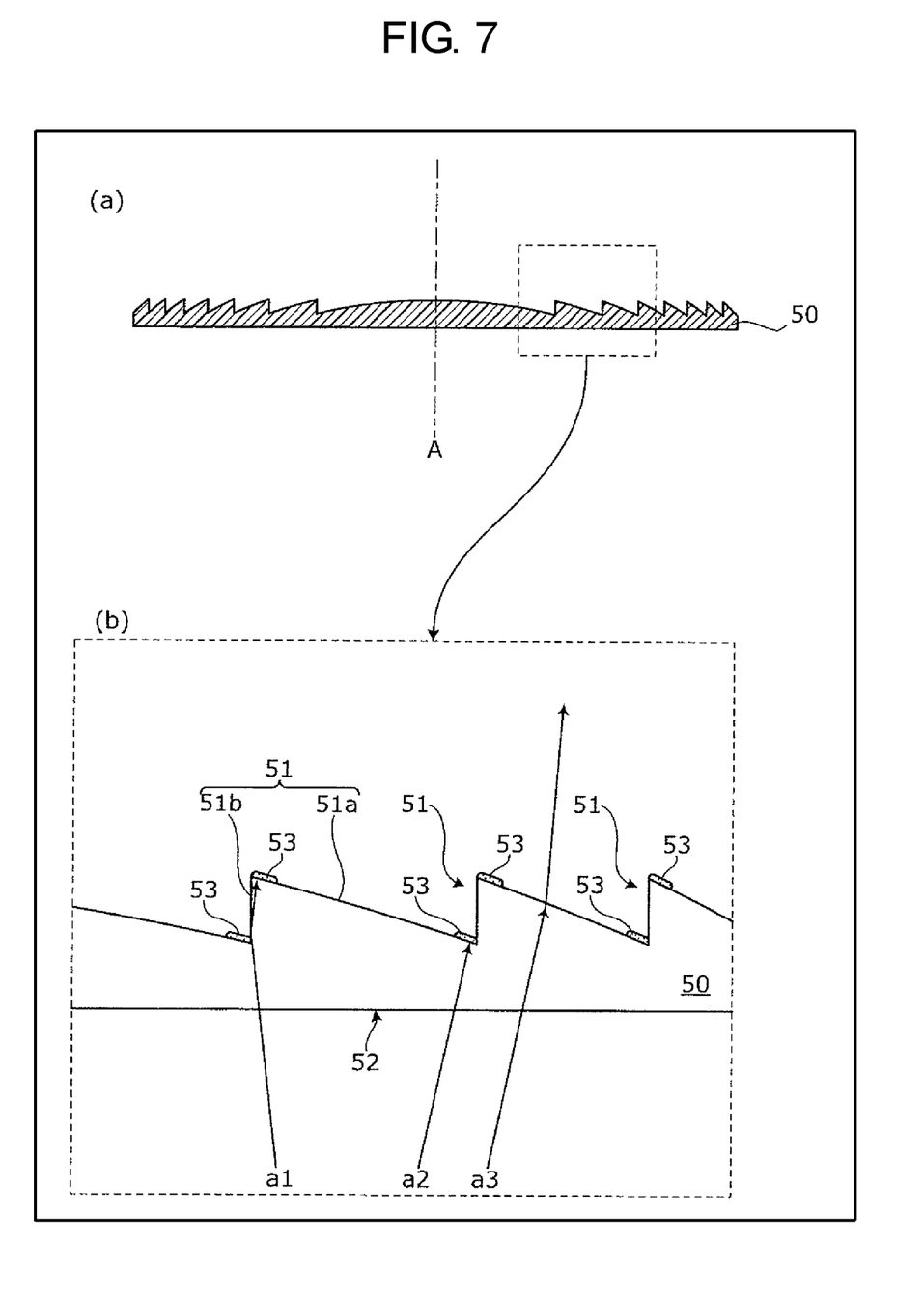
FIG. 7 is a sectional view taken along line VII-VII in FIG. 6.

A specific configuration of Fresnel lens 50 of the first exemplary embodiment will be described below with reference to FIGS. 6 and 7. FIG. 6 is a plan view illustrating the Fresnel lens of the first exemplary embodiment when the Fresnel lens is viewed from an optical axis direction. FIG. 7 is a sectional view taken along line VII-VII in FIG. 6. Part (a) of FIG. 7 is a view illustrating a whole of the sectional view of Fresnel lens 50, and part (b) of FIG. 7 is an enlarged view illustrating a part of the sectional view of Fresnel lens 50.

As illustrated in FIGS. 6 and 7, Fresnel lens 50 is a rectangular plate-shaped member, and includes flat face 52 disposed on an incident side of the light beam and sawtooth corrugated face 51 disposed on an output side of the light beam. That is, a face on an opposite side to corrugated face 51 of Fresnel lens 50 is flat face 52. For example, Fresnel lens 50 is made of a resin such as acryl. Corrugated face 51 of Fresnel lens 50 is formed by alternately disposing first face 51a inclined relative to optical axis A and second face 51b substantially parallel to optical axis A. Corrugated face 51 is concentrically formed as illustrated in FIG. 6.

First face 51a is a light focusing surface that focuses the light beam incident on Fresnel lens 50 on a predetermined focal point. That is, first face 51a refracts the light beam incident on Fresnel lens 50 toward the predetermined focal point. A plurality of first faces 51a are concentrically formed, and an inclination angle relative to optical axis A becomes larger as first face 51a is disposed inside (the side of optical axis A) in the plurality of first faces 51a.

Second face 51b is a wall surface that does not focus the light beam on the predetermined focal point. Second face 51b is a wall surface that is formed to offset first face 51a that is the light focusing surface in order to thin a convex lens.

In adjacent first face 51a and second face 51b, which form a protruded shape protruding toward the output side, first face 51a is a face disposed outside second face 51b.

Fresnel lens 50 includes light shielding mask 53 in a part of the region adjacent to second face 51b in first face 51a. Specifically, light shielding mask 53 is a coating film that is formed by spraying paint having a light shielding property by inkjet printing or the like. Light shielding mask 53 is formed in a part of the inside (the side of optical axis A) region and a part of the outside region in first face 51a. A plurality of light shielding masks 53 are concentrically formed when viewed from the direction of optical axis A.

[1-4. Effect]

According to Fresnel lens 50 of the first exemplary embodiment, among the incident light beams, incident light beams a1, a2 reflected by second face 51b substantially parallel to optical axis A strike on light shielding mask 53, so that incident light beams a1, a2 can be prevented from being output from Fresnel lens 50 toward the outside. Among the incident light beams, incident light beam a3 that is not reflected by second face 51b does not strike on light shielding mask 53, so that incident light beam a3 can be output from Fresnel lens 50 toward the outside. Therefore, the generation of the stray light due to the reflection of the light by second face 51b can effectively be reduced.

[1-5. First Modification of First Exemplary Embodiment]

In Fresnel lens 50 of the first exemplary embodiment, light shielding mask 53 is provided on the side of corrugated face 51. Alternatively, light shielding mask 53 may be provided on the side of flat face 52.

Figure 8:
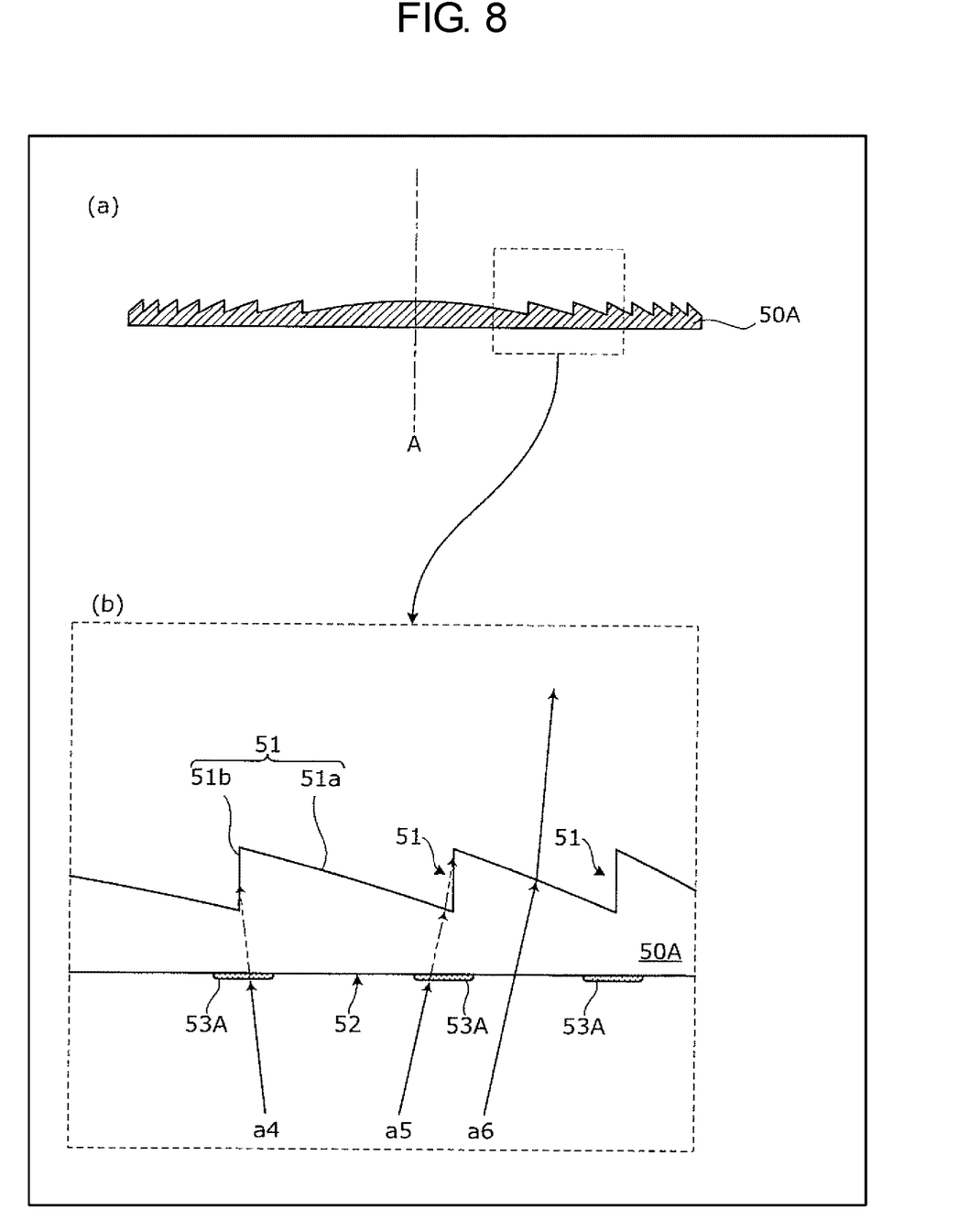
FIG. 8 is a sectional view illustrating a Fresnel lens according to a first modification of the first exemplary embodiment, and is a sectional view corresponding to FIG. 7.

A specific configuration of Fresnel lens 50A according to a first modification of the first exemplary embodiment will be described with reference to FIG. 8. FIG. 8 is a sectional view illustrating the Fresnel lens of the first modification of the first exemplary embodiment, and is a sectional view corresponding to FIG. 7. It is assumed that the configuration excluding light shielding mask 53A in Fresnel lens 50A of the first modification of the first exemplary embodiment is similar to the configuration excluding light shielding mask 53 in Fresnel lens 50 of the first exemplary embodiment.

As described above, Fresnel lens 50A is different from Fresnel lens 50 of the first exemplary embodiment in that the face in which light shielding mask 53A is formed is flat face 52 on the incident side. That is, in flat face 52, light shielding mask 53A is formed at a position opposite second face 51b. For example, as illustrated in part (b) of FIG. 8, light shielding mask 53A is formed in a region where incident light beams a4, a5 to be incident on Fresnel lens 50A at an angle at which incident light beams a4, a5 are reflected by second face 51b are prevented from being incident on Fresnel lens 50A, in the region of flat face 52. On the other hand, light shielding mask 53A is not formed in a region where incident light beam a6 to be incident on Fresnel lens 50A at an angle at which incident light beam a6 is not reflected by second face 51b is incident on Fresnel lens 50A, in the region of flat face 52. In part (b) of FIG. 8, a path of the light beam is indicated by an alternate long and two short dashes line in the case that incident light beams a4, a5 are not shielded by light shielding mask 53A.

A region where light shielding mask 53A is formed can be obtained by the angle of the incident light beam, the angle at which the incident light beam is refracted by flat face 52, and the shape of Fresnel lens 50A.

Similarly to the first exemplary embodiment, a plurality of light shielding masks 53A are concentrically formed when viewed from the direction of optical axis A.

[1-6. Second Modification of First Exemplary Embodiment]

In Fresnel lenses 50, 50A of the first exemplary embodiment and the first modification, light shielding mask 53 is provided in the front side of Fresnel lenses 50, 50A. Alternatively, Fresnel lens unit 70 in which light shielding mask 61 is formed on transparent plate-shaped member 60 disposed adjacent to a Fresnel lens and on the optical axis of the Fresnel lens may be used. That is, Fresnel lens unit 70 including Fresnel lens 50B in which the light shielding mask is not formed and plate-shaped member 60 in which light shielding mask 61 is formed may be used instead of Fresnel lenses 50, 50A.

Figure 9:
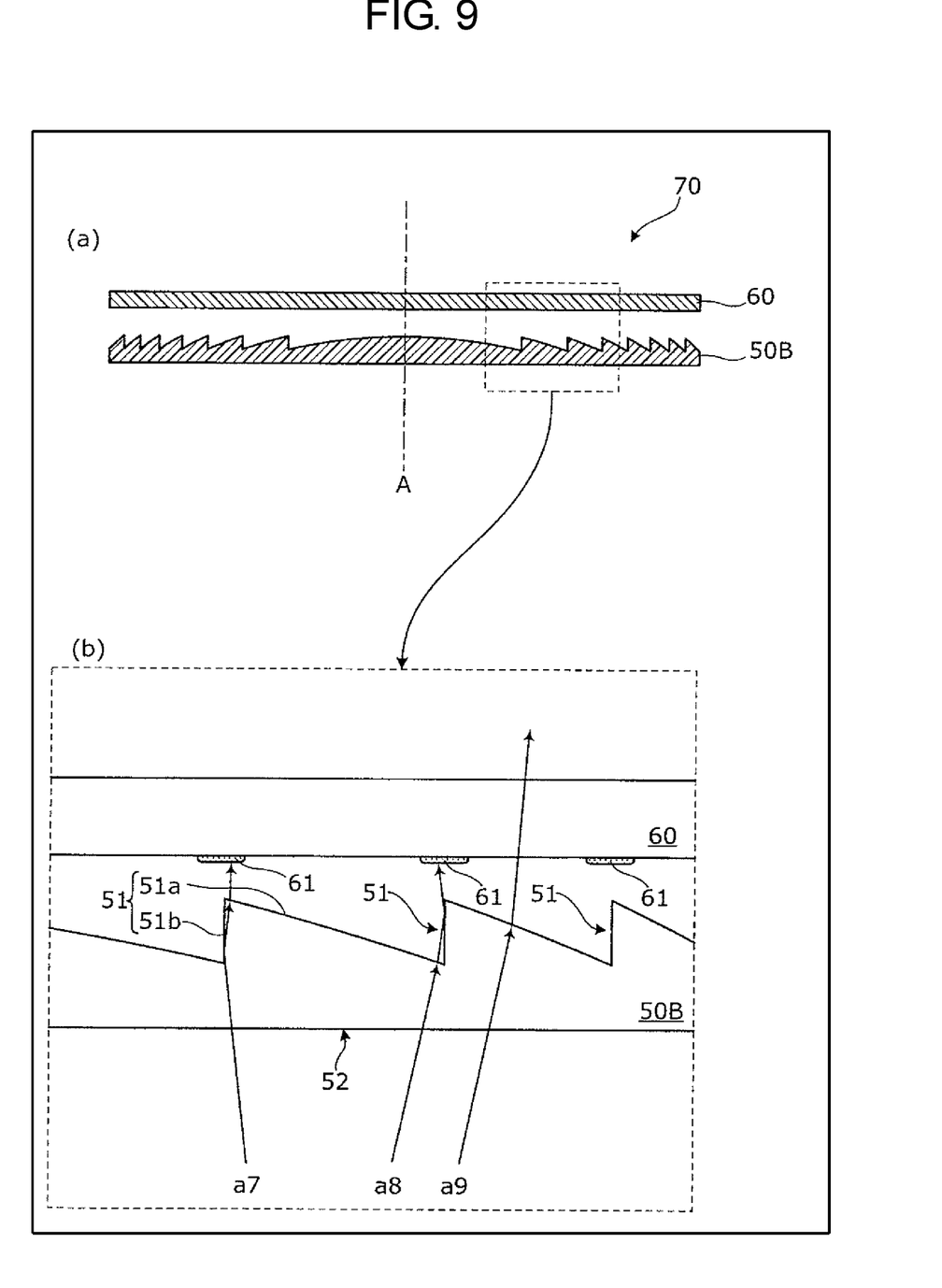
FIG. 9 is a sectional view illustrating a Fresnel lens according to a second modification of the first exemplary embodiment, and is a sectional view corresponding to FIG. 7.

A specific configuration of Fresnel lens unit 70 according to a second modification of the first exemplary embodiment will be described with reference to FIG. 9. FIG. 9 is a sectional view illustrating the Fresnel lens of the second modification of the first exemplary embodiment, and is a sectional view corresponding to FIG. 7. It is assumed that Fresnel lens 50B has a configuration similar to the configuration excluding light shielding mask 53 of Fresnel lens 50 of the first exemplary embodiment.

As illustrated in FIG. 9, Fresnel lens unit 70 includes Fresnel lens 50B in which the light shielding mask is not formed and transparent plate-shaped member 60.

Plate-shaped member 60 is a transparent plate-shaped member (substrate) disposed opposite Fresnel lens 50B, and light shielding mask 61 is disposed opposite second face 51b of Fresnel lens 50B. For example, as illustrated in part (b) of FIG. 9, light shielding mask 61 is formed in the surface on the incident side of plate-shaped member 60, and formed in the region on which light beams a7,a8 reflected by second face 51b of Fresnel lens 50B strike, in the surface on the incident side of plate-shaped member 60. That is, light shielding mask 61 is formed in the region where light beams a7, a8 reflected by second face 51b of Fresnel lens 50B are prevented from being output from Fresnel lens unit 70. On the other hand, light shielding mask 61 is not formed in the region on which light beam a9 output without being reflected by second face 51b strikes, in the surface on the incident side of plate-shaped member 60.

The region where light shielding mask 61 is formed can be obtained by the angle of the light beam incident on Fresnel lens 50B, the angle at which the light beam is refracted by flat face 52, the angle at which the light beam is reflected by second face 51b, the angle at which the light beam is refracted by corrugated face 51, and the shape of Fresnel lens 50B.

[1-7. Third Modification of First Exemplary Embodiment]

Figure 10:
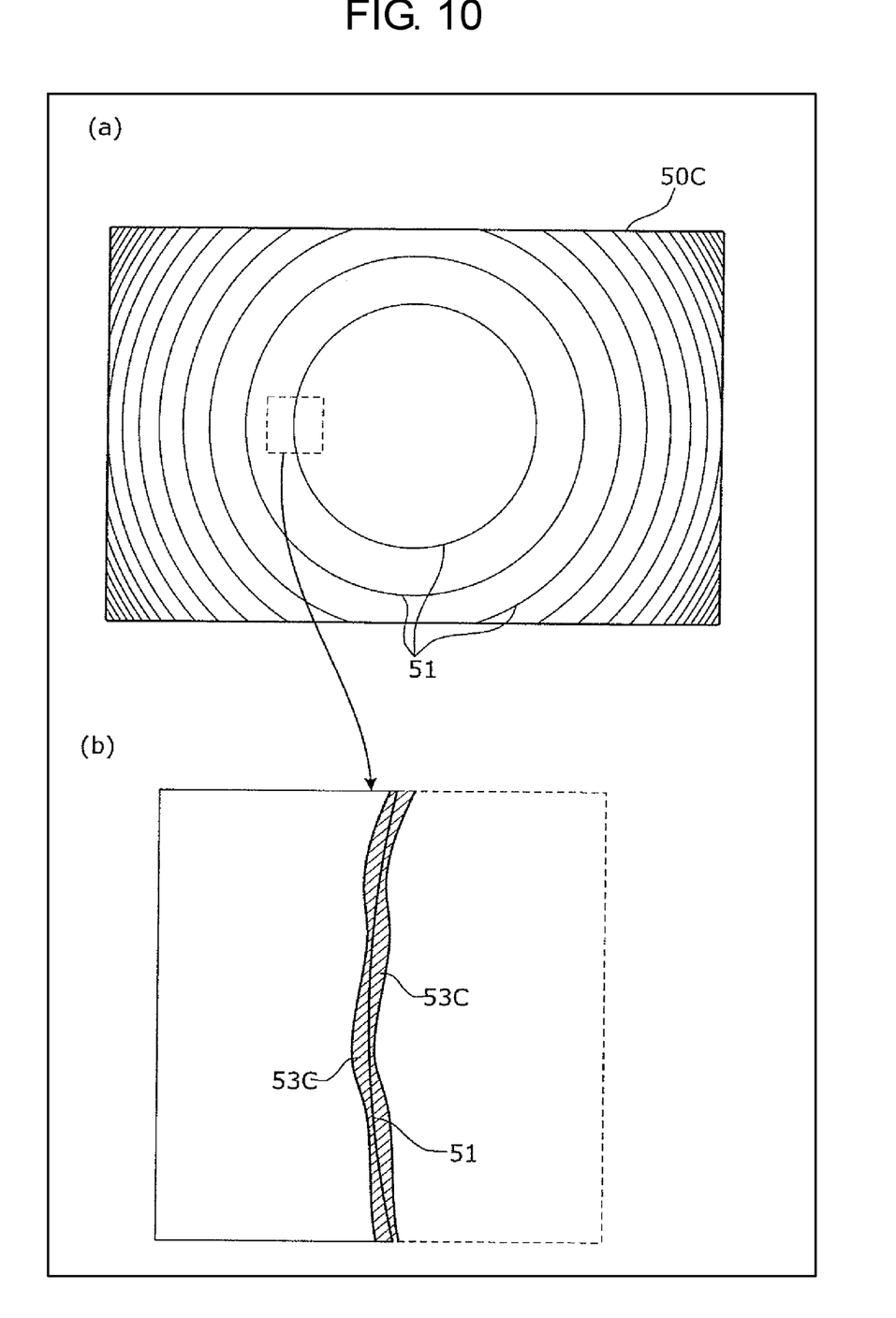
FIG. 10 is a plan view illustrating a Fresnel lens according to a third modification of the first exemplary embodiment when the Fresnel lens is viewed from the optical axis direction.

Although not particularly described in Fresnel lens 50 of the first exemplary embodiment, light shielding mask 53 may have a shape as illustrated in FIG. 10.

FIG. 10 is a plan view illustrating a Fresnel lens according to a third modification of the first exemplary embodiment when the Fresnel lens is viewed from the optical axis direction. Part (a) of FIG. 10 is a plan view illustrating Fresnel lens 50C when Fresnel lens 50C is viewed from the optical axis direction, and part (b) of FIG. 10 is an enlarged view of a part of part (a) of FIG. 10.

As illustrated in part (b) of FIG. 10, an edge of a mask pattern of light shielding mask 53C has a meandering shape. Specifically, radially inside and outside edges have the meandering shape in the mask pattern of circularly-formed light shielding mask 53C.

In Fresnel lens 50 of the first exemplary embodiment in which light shielding mask 53 is used, the incident light beam or the output light beam is shielded by light shielding mask 53, so that the light beam is diffracted to generate slight stray light in an edge of the mask pattern of light shielding mask 53. The lightly shinning mask pattern is seen from the observer. On the other hand, in light shielding mask 53C of the third modification of the first exemplary embodiment, the direction in which the stray light is diffracted can vary depending on the angle of the edge, so that the diffracted light can be dispersed at a wide angle. Consequently, the diffracted light visually observed by the observer can be reduced.

The shape of light shielding mask 53C may be applied to Fresnel lens 50A of the first and second modifications of the first exemplary embodiment and light shielding masks 53A, 61 of Fresnel lens unit 70.

Second Exemplary Embodiment

Figure 11:
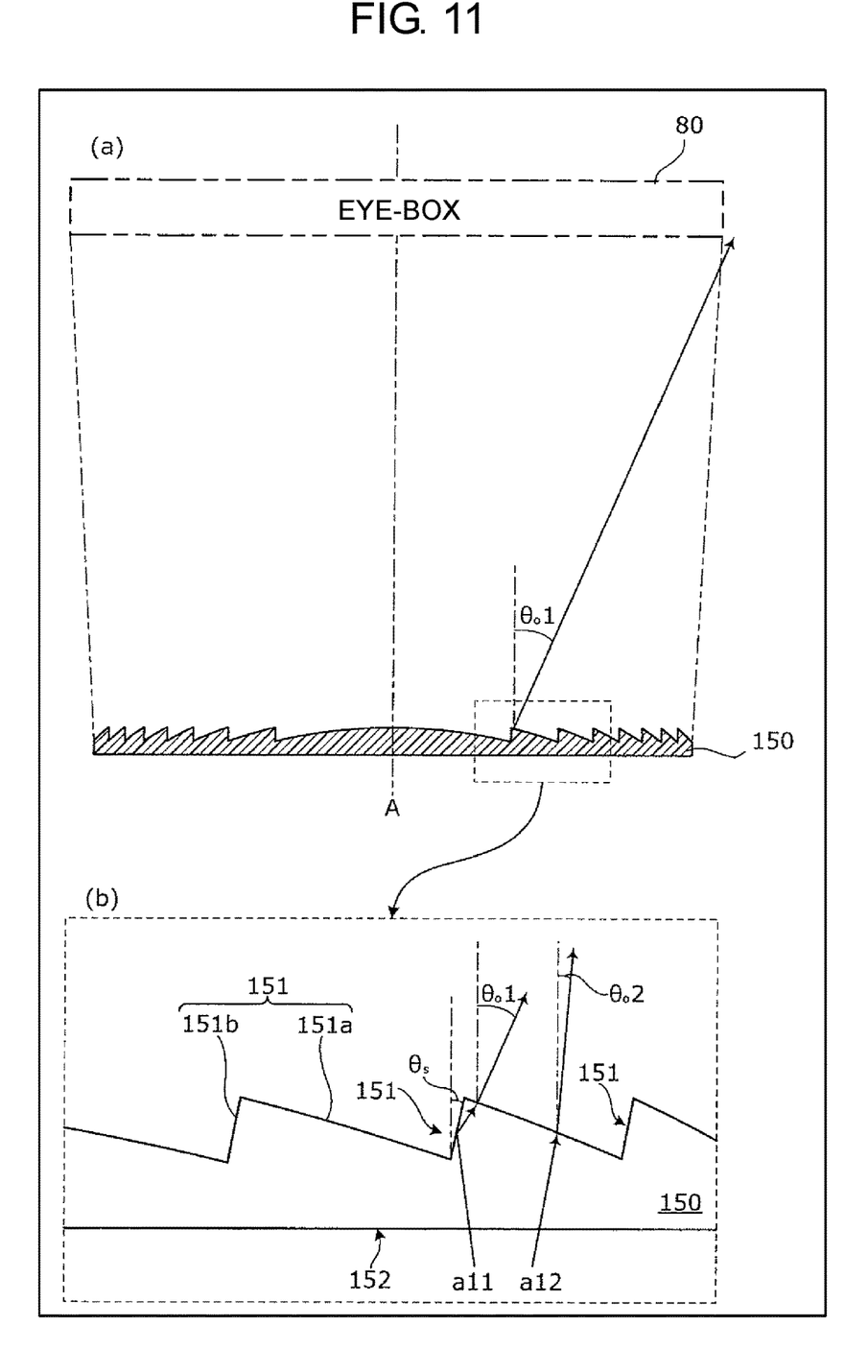
FIG. 11 is a sectional view illustrating a Fresnel lens according to a second exemplary embodiment, and is a sectional view corresponding to FIG. 7.

Fresnel lens 150 according to a second exemplary embodiment will be described below.

In order not to output the light beam reflected by second face 51b, which causes the stray light, light shielding masks 53, 53A, 61 that shield the reflected light beam are formed in Fresnel lenses 50, 50A and Fresnel lens unit 70 of the first exemplary embodiment and its modifications. On the other hand, in the second exemplary embodiment, the stray light is not shielded by light shielding masks 53, 53A, 61.

[2-1. Configuration of Fresnel Lens]

A specific configuration of Fresnel lens 150 according to the second exemplary embodiment will be described with reference to FIG. 11. FIG. 11 is a sectional view illustrating the Fresnel lens of the second exemplary embodiment, and is a sectional view corresponding to FIG. 7.

As illustrated in FIG. 11, Fresnel lens 150 of the second exemplary embodiment includes flat face 152 on the incident side of the light beam and sawtooth corrugated face 151 on the output side of the light beam. That is, the face on the opposite side to corrugated face 151 of Fresnel lens 150 is flat face 152. For example, Fresnel lens 150 is made of a resin such as acryl. Corrugated face 151 of Fresnel lens 150 is concentrically formed.

First face 151a is a light focusing surface that focuses the light beam incident on Fresnel lens 50 on a predetermined focal point. That is, first face 151a refracts the light beam incident on Fresnel lens 150 toward the predetermined focal point. A plurality of first faces 151a are concentrically formed, and an inclination angle relative to optical axis A becomes larger as first face 151a is disposed inside (the side of optical axis A) in the plurality of first faces 151a.

Second face 151b is a wall surface that does not focus the light beam on the predetermined focal point. Second face 151b is a wall surface that is formed by offsetting first face 151a that is the light focusing surface in order to thin a convex lens.

In adjacent first face 151a and second face 151b, which form a protruded shape protruding toward the output side, first face 151a is a face disposed outside second face 151b.

Second face 151b is formed obliquely relative to optical axis A of Fresnel lens 150 at an angle at which the light beam striking on second face 151b is reflected toward out of range of eye-box 80. Second face 151b is formed obliquely relative to optical axis A such that the light beam spreads outwardly from the incident side toward the output side. That is, first face 151a and second face 151b are formed in the region where first face 151a and second face 151b do not overlap each other when viewed from the direction of optical axis A.

The plurality of second faces 151b constituting corrugated face 151 are formed obliquely relative to the optical axis as second face 151b is disposed on the outside.

Fresnel lens 150 can specifically be configured as follows.

It is assumed that a distance from driver 12 to image 8 that is the virtual image is 2 m, that a distance from driver 12 to Fresnel lens is 1 m, that a horizontal width of image 8 is 400 mm, and that a horizontal width of eye-box 80 is 130 mm. In this case, a horizontal width of Fresnel lens 150 becomes 270 mm, and incident angle θin of Fresnel lens 150 becomes about ±4 degrees in a vicinity of optical axis A of Fresnel lens 150, and becomes 4 degrees to 12 degrees at a horizontal edge of Fresnel lens 150. At this point, inclination angle θs of second face 151b of Fresnel lens 150 is set to 4 degrees or more in the vicinity of optical axis A of Fresnel lens 150, and set to 12 degrees or more at the horizontal edge of Fresnel lens 150, which allows the light beam reflected by second face 151b to be turned away out of range of eye-box 80.

[2-2. Effect]

According to Fresnel lens 150 of the second exemplary embodiment, among the incident light beams, incident light beam a11 reflected by second face 151b that is the wall surface that does not focus the light beam on the focal point is output toward out of range of eye-box 80 (output angle θo1), so that incident light beam a11 can be prevented from being visually recognized by driver 12 that is the observer. Among incident light beams, incident light beam a12 that is not reflected by second face 151b is output toward within range of eye-box 80 (output angle θo2), so that incident light beam a12 can visually be recognized by driver 12. Therefore, the visual recognition of the stray light by the driver due to the reflection of the light beam by second face 151b can effectively be reduced.

[2-3. First Modification of Second Exemplary Embodiment]

In Fresnel lens 150 of the second exemplary embodiment, first face 151a and second face 151b are formed in the region where first face 151a and second face 151b do not overlap each other when viewed from the direction of optical axis A. However, the present invention is not limited to Fresnel lens 150 of the second exemplary embodiment.

Figure 12:
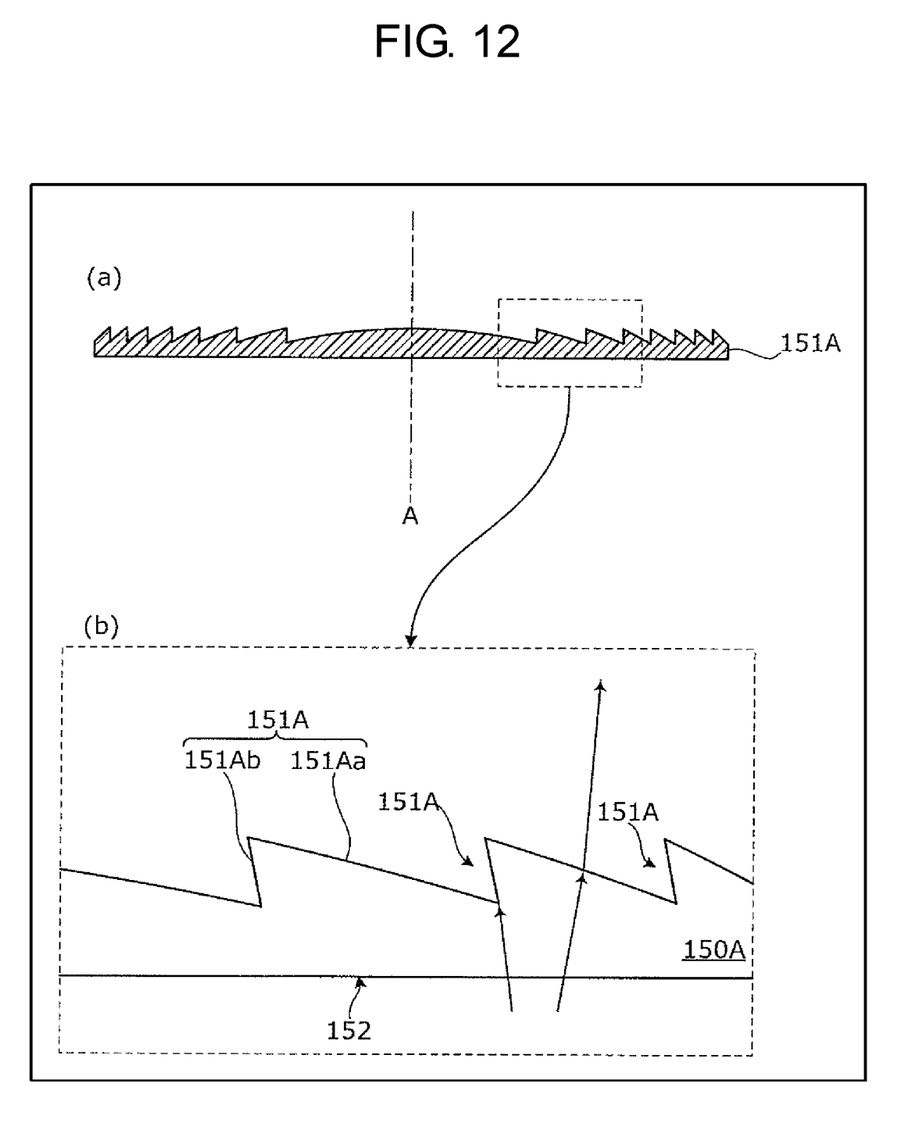
FIG. 12 is a sectional view illustrating a Fresnel lens according to a first modification of the second exemplary embodiment, and is a sectional view corresponding to FIG. 7.

A specific configuration of Fresnel lens 150A according to a first modification of the second exemplary embodiment will be described with reference to FIG. 12. FIG. 12 is a sectional view illustrating the Fresnel lens of the first modification of the second exemplary embodiment, and is a sectional view corresponding to FIG. 7.

As illustrated in FIG. 12, Fresnel lens 150A differs from Fresnel lens 150 of the second exemplary embodiment in that first face 151Aa and second face 151Ab overlap each other when viewed from the optical axis. That is, second face 151Ab is formed obliquely relative to optical axis A of Fresnel lens 150A at an angle at which the light beam incident on Fresnel lens 150A does not strike directly on the wall surface.

Therefore, the light beam incident on Fresnel lens 150A is prevented from striking directly on second face 151Ab, so that the visual recognition of the stray light by the driver due to the reflection of the light beam by second face 151Ab can effectively be reduced.

Other Exemplary Embodiments

The head-up displays according to one or more aspects have been described above based on the exemplary embodiments. However, the present invention is not limited to the exemplary embodiments. Configurations in which various variations conceived by those skilled in the art are applied to the present exemplary embodiment, and configurations established by combining components in different exemplary embodiments or modifications may also fall within the scope of one or more aspects, without departing from the gist of the present invention.

In the typical head-up display, because a viewing angle is as relatively small as 20 degrees or less, the light beam incident on the Fresnel lens has a relatively small incident angle distribution, and the inclination angle of the wall surface is set as relatively small as 20 degrees or less, so that a light loss can be decreased to effectively prevent the stray light due to the reflected light beam. However, the present invention is not limited to the exemplary embodiments.

For example, in the above exemplary embodiments, although the case that head-up display 2 (2A) is mounted on automobile 4 has been described, the present invention is not limited to the case. Head-up display 2 (2A) may be mounted on motorcycles, airplanes, trains, or ships.

Although the case that head-up display 2 (2A) is mounted on the vehicle has been described, the present invention is not limited to the case. For example, head-up display 2 (2A) may be mounted on glasses configured as a wearable device.

In the above exemplary embodiments, the constituents may be implemented by dedicated hardware or by execution of software programs individually suitable for the constituents. The constituents may be implemented by a program execution unit, such as a CPU or a processor, reading and executing software programs stored in a recording medium such as a hard disk or a semiconductor memory.

The following cases are also involved in the present invention.

(1) Specifically, the above-described devices can be implemented using a computer system configured with a microprocessor, a read only memory (ROM), a random access memory (RAM), a hard disk unit, a display unit, a keyboard, a mouse, and the like. A computer program is stored in the RAM or the hard disk unit. The microprocessor operates according to the computer program, whereby the devices achieve the respective functions. At this point, the computer program is configured by combining a plurality of instruction codes that indicate instructions to a computer, in order to achieve predetermined functions.

(2) A part or all of the constituents configuring the above-described devices may be configured with a single-chip system Large Scale Integration (LSI). The system LSI is a super multi-functional LSI manufactured such that a plurality of constituent units is integrated into a single chip, and specifically, is a computer system including the microprocessor, the ROM, the RAM, and the like. The ROM stores the computer program. The microprocessor loads the computer program from the ROM to the RAM, and performs operation such as computation according to the loaded computer program, whereby the system LSI achieves its functions.

(3) A part or all of the constituents configuring the above-described devices may be configured with an integrated circuit (IC) card detachable from each of the devices, or a single module. The IC card or the module is the computer system configured with the microprocessor, the ROM, the RAM, and the like. The IC card or the module may include the above-described super multi-functional LSI. The microprocessor operates according to the computer program, and thus the IC card or the module achieves its functions. The IC card or the module may have tamper resistance.

(4) The present invention may be implemented by using the above methods. Those methods may be implemented by using the computer program that is implemented by the computer, or may be implemented by using digital signals according to the computer program.

The present invention may be implemented by using a configuration that stores the computer program or the digital signals into a computer-readable recording medium such as a flexible disk, a hard disk, a compact disk (CD)-ROM, a magneto-optical disk (MO), a digital versatile disk (DVD), a DVD-ROM, a DVD-RAM, a Blu-ray (registered trademark) disk (BD), and a semiconductor memory. The present invention may be implemented by using the digital signals stored in those recording media.

The present invention may transmit the computer program or the digital signals via a network represented by a telecommunications line, a wireless or wired communication line, and the Internet, data broadcasting, and the like.

The present invention may be the computer system including the microprocessor and the memory. The memory may store the computer program, and the microprocessor may operate according to the computer program.

The program or the digital signals may be performed by another computer system that is independently provided, by being stored into a recording medium to be transported to the other computer, or by being transported to the other computer via networks and the like.

(5) The above exemplary embodiments and the above modifications may be combined.

INDUSTRIAL APPLICABILITY

For example, the Fresnel lens of the present invention is applicable to a vehicular head-up display.

REFERENCE MARKS IN THE DRAWINGS

2: head-up display
4: automobile
6: dashboard
8: image
10: windshield
11: region
12: driver
14: scene
16: space
18: vertical image
20: depth image
22: pedestrian
24: road
26: light projection unit
28: movable screen
30: drive unit
32: image projection unit
34: controller
36: light source
38: scanner
44: magnifying lens
46: first reflecting plate
48: second reflecting plate
50, 50A, 50B, 50C, 150, 150A: Fresnel lens
51, 151: corrugated face
51a, 151a, 151Aa: first face
51b, 151b, 151Ab: second face
52, 152: flat face
53, 53A, 53C, 61: light shielding mask
60: plate-shaped member
70: Fresnel lens unit
80: eye-box
a1 to a6, a11, a12: incident light beam
a7 to a9: light beam

The invention claimed is:

1. A Fresnel lens unit comprising:
a Fresnel lens including a sawtooth corrugated face that is formed by alternately disposing a first face inclined relative to an optical axis and a second face parallel to the optical axis,
a transparent plate-shaped member disposed opposite the Fresnel lens, a light shielding mask being formed at a position opposite the second face, in the plate-shaped member,
wherein an edge of a mask pattern of the light shielding mask has a meandering shape.

2. A head-up display comprising:
a light source that emits a light beam;
a scanner that scans the light beam from the light source;
a screen on which an image is formed by transmission of the light beam from the scanner through the screen; and
an optical system that displays a virtual image of the image formed on the screen in a space,
wherein the optical system includes the Fresnel lens unit according to claim 1.

3. A head-up display comprising:
a light source that emits a light beam;
a scanner that scans the light beam from the light source;
a screen on which an image is formed by transmission of the light beam from the scanner through the screen; and
an optical system that displays a virtual image of the image formed on the screen in a space, the optical system including a Fresnel lens comprising:
a sawtooth corrugated face formed by alternately disposing a first face inclined relative to an optical axis and a second face parallel to the optical axis,
wherein a light shielding mask is on edge portions of the first face, the edge portions each being in contact with a corresponding one of second faces, the second faces each being the second face.

4. The Fresnel lens according to claim 3, wherein an edge of a mask pattern of the light shielding mask has a meandering shape.

* * * * *